Jan. 2, 1962 W. J. BROWNER 3,015,333
DEVICE FOR ELECTRICAL CONTRACTION OF BODILY TISSUES
Filed Oct. 19, 1956

INVENTOR.
WILLIAM J. BROWNER
BY Jesse P. Whann
ATTORNEY

3,015,333
DEVICE FOR ELECTRICAL CONTRACTION OF BODILY TISSUES

William J. Browner, San Mateo, Calif., assignor to Relaxacizor, Inc., Los Angeles, Calif., a corporation of California Filed Oct. 19, 1956, Ser. No. 617,195
4 Claims. (Cl. 128—424)

This invention relates to a simple device for the electrical treatment of bodily tissues, capable of passing through the bodily tissues an oscillatory current having a wave form approximately congruent to the wave form of the nerve currents of the human body.

It is an object of the invention to provide a device for producing tissue stimulation and muscular contraction with minimum application of electrical energy, such as that which may be supplied from one or two small battery cells. This desired result is made possible by the use of electrical components which will deliver an oscillatory current having a wave form so similar to that of the nerve current of the human body that effective muscular contraction is accomplished with minimum electrical energy, and substantially without producing a stinging sensation where the electrodes of the device make contact with a patient's skin.

It is a further object of the invention to provide a device for treatment of bodily tissues, the device having a battery fed oscillatory circuit including simple and relatively inexpensive electrical parts and avoiding need for complex electrical components.

It is a further object of the invention to provide a device having a simple arrangement including a periodic switch for alternately closing and opening the circuit of the device, an intermittent switch, a small battery and an induction element connected to the intermittent switch so as to actuate the intermittent switch and inductively cooperate so as to produce an oscillatory current having a wave form which is superior to that obtained from many complex devices having one or more vacuum tubes and associated inductors and capacitors. The device is so small and light in weight that it may be readily carried upon the person of the user.

Further objects and advantages of the invention may be brought out in the following part of the specification wherein some details have been described merely for the purpose of supplementing the disclosure, without intending to limit the scope of the invention which is defined by the claims.

Referring to the accompanying drawings which are for illustrative purposes only:

Figure 1:
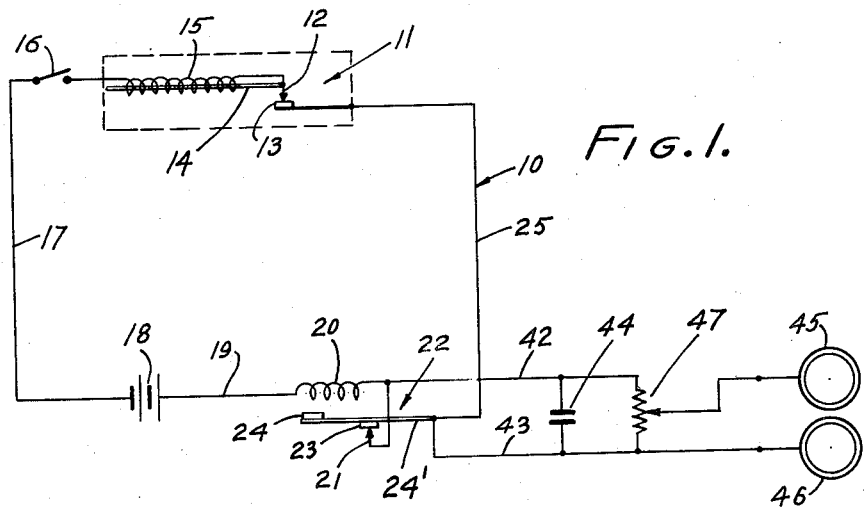
FIG. 1 is an electrical diagram showing a preferred form of invention.

The preferred embodiment of the body-treating device comprises a circuit 10 which includes a periodic switch device 11 having contacts 12 and 13. The contact 12 is movable, and its movement to and from contact with the contact 13 is controlled by a thermo-responsive element 14. The contact 12 is connected through a heating coil 15 with a main control switch 16 which is in turn connected through a conductor 17 with one terminal of a battery 18.

The remaining terminal of the battery 18 is connected through a conductor 19 with an inductance coil 20 which is in turn connected to the contact 21 of an intermittent switch 22. The second contact 23 of the intermittent switch 22 is mounted upon a reed 24' having at one end thereof an armature 24 disposed in operative relation to the inductance coil 20. The contact 23 of the switch 22 is connected by a conductor 25 with the contact 13 of the periodic switch 11. The electrical components of the circuit 10 are connected in series.

Figure 2:
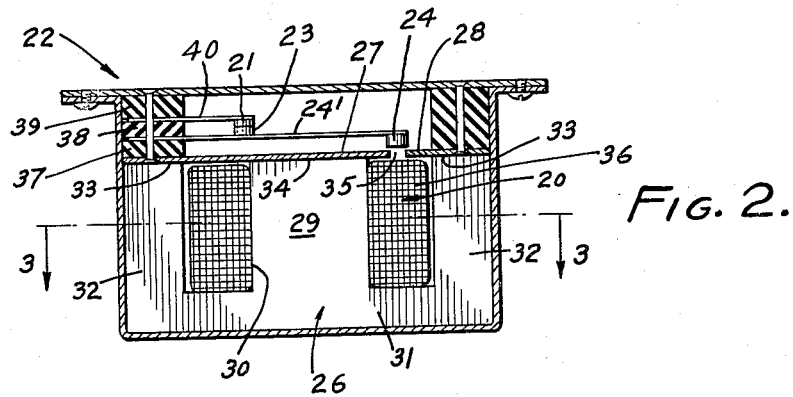
FIG. 2 is a sectional view through the wave generator of the device.
Figure 3:
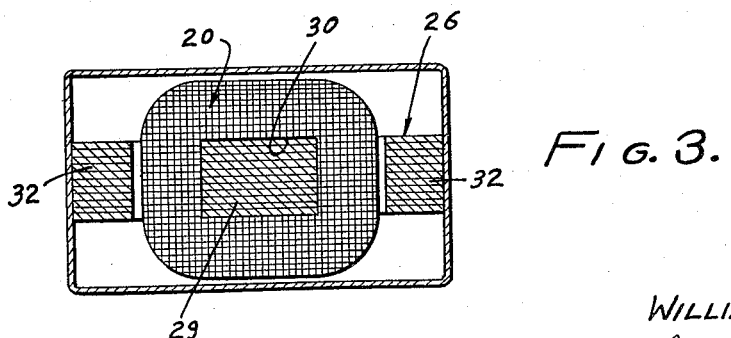
FIG. 3 is a cross-section taken as indicated by the line 3—3 of FIG. 2.

As shown in FIGS. 2 and 3 the coil 20 is nearly completely embraced by a magnetic circuit comprising a laminated E-shaped part 26 and end closing parts 27 and 28. The E-shaped part of the magnetic circuit has a middle or core part 29 which extends through the opening 30 of the coil 20, a bottom part 31 which extends from the core part 29 across the bottom of the coil 20 and side parts 32 which extend upwardly from the bottom part 31 across external sides of the coil 20. The upper end faces 33 of the side parts 32 are approximately in the same plane as the upper end face 34 of the core part 29. The end closing parts 27 and 28 comprise iron strips one of which is longer than the other so that when they are placed across the end faces 33 and 34 a relatively small gap 35 will be formed contiguous to the side 36 of the coil 20.

At the side of the E-shaped part 26 opposite from the gap 35, insulators 37, 38 and 39 are arranged to support the reed 24' which at its free end carries the armature 24 in a position contiguous to the gap 35, and also a short metal reed 40 for supporting the contact 21 in engagement with the contact 23 when the reed 24' is motionless or when it is moving upwardly from the position in which it is shown in FIG. 2. As is shown in FIG. 1 output conductors 42 and 43 are connected in parallel with the intermittent switch 22, the conductor 42 being connected to the contact 21 and the conductor 43 being connected to the contact 23. For protection of the contacts a capacitor 44 is connected across the switch 22. Means are provided for connecting the output conductors 42 and 43 with selected skin areas of the patient's body. Electrodes 45 and 46 are provided in the form of pads arranged to be placed in contact with the patient's skin. The pads 45 and 46 are connected to the output conductors 42 and 43 by a rheostat 47 whereby the strength of the electrical energy delivered through the pads to the tissues of the patient may be suitably adjusted.

The reed 24' of the intermittent switch 22 is tuned so as to vibrate at a frequency which will effect through the coil 20 an oscillatory output current having a frequency to which muscular tissues of the human body will respond in contraction. For example, the reed 24' may be tuned for about 80 cycles per second, thereby providing an oscillatory output current of suitable frequency and which, owing to the composition of the oscillator unit including the coil 20 and the magnetic circuit associated therewith, will have a wave form closely simulating that of bodily nerve currents.

I claim:

1. In a device for electrical treatment of the bodily tissues: an electrical circuit comprising a periodic switch for alternately closing and opening the circuit, a battery, an induction coil, and an intermittent switch, connected in series; magnetic conductors disposed so as to form a magnetic circuit for the coil; an armature disposed so as to be attracted by only a part of the magnetic flux generated by the energization of said coil; resilient means supporting the armature for oscillating movement; means connecting the armature to said intermittent switch so as to open and close the same; a pair of output conductors connected respectively to the contacts of said intermittent switch in parallel therewith; and means for connecting body contact pads to said output conductors so that the electrical current from said induction coil will pass through the bodily tissues connected in series with said body contact pads.

2. In a device for electrical treatment of the bodily tissues: an electrical circuit comprising a periodic switch for alternately closing and opening the circuit, a battery an induction coil, and an intermittent switch, connected in series; magnetic conductors disposed so as to embrace the coil and so as to form a magnetic circuit having therein a gap adjacent one side of the coil; an armature disposed adjacent said gap so as to be moved by magnetism from the coil which crosses said gap; resilient means supporting the armature for oscillating movement; means connecting the armature to said intermittent switch so as to open and close the same; a pair of output conductors connected respectively to the contacts of said intermittent switch in parallel therewith; and means for connecting body contact pads to said output conductors so that the electrical current from said induction coil will pass through the bodily tissues connected in series with said body contact pads.

3. In a device for electrical treatment of the bodily tissues: an electrical circuit comprising a periodic switch for alternately closing and opening the circuit, a battery, an induction coil, and an intermittent switch, connected in series; a magnetic circuit for the coil comprising a core part lying within the opening of the coil, a bottom part extending across the bottom of the core part, side parts extending up the sides of said coil from said bottom part, and a top part extending across the tops of said core part and said side part and forming a gap eccentrically of the coil; an armature disposed adjacent said gap so as to be moved by magnetism from the coil which crosses said gap; resilient means supporting the armature for oscillating movement; means connecting the armature to said intermittent switch so as to open and close the same; a pair of output conductors connected respectively to the contacts of said intermittent switch in parallel therewith; and means for connecting body contact pads to said output conductors so that the electrical current from said induction coil will pass through the bodily tissues connected in series with said body contact pads.

4. In a device for electrical treatment of the bodily tissues: an electrical circuit comprising a periodic switch for alternately closing and opening the circuit, a battery, an induction coil, and an intermittent switch, connected in series; a magnetic circuit for the coil comprising a E-shaped main part supporting the coil, and end-closing parts closing the open end of said E-shaped part, said end-closing parts defining a gap; an armature disposed adjacent said gap so as to be moved by magnetism from the coil which crosses said gap; resilient means supporting the armature for oscillating movement; means connecting the armature to said intermittent switch so as to open and close the same; a pair of output conductors connected respectively to the contacts of said intermittent switch in parallel therewith; and means for connecting body contact pads to said output conductors so that the electrical current from said induction coil will pass through the bodily tissues connected in series with said body contact pads.

References Cited in the file of this patent

UNITED STATES PATENTS

| | | |
|---|---|---|
| 1,373,818 | Ireland | Apr. 5, 1921 |
| 1,390,429 | Cape | Sept. 13, 1921 |
| 1,400,149 | Gleeson | Dec. 13, 1921 |
| 1,617,157 | Herdman | Feb. 8, 1927 |
| 2,737,183 | Giaimo | Mar. 6, 1956 |